March 12, 1957
M. A. RUDNER
2,785,219
STAND-OFF TERMINALS
Filed Sept. 23, 1952
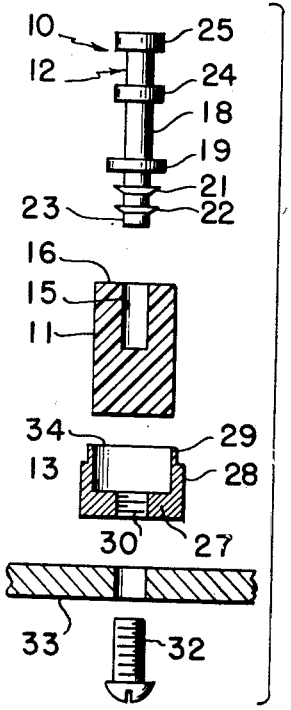
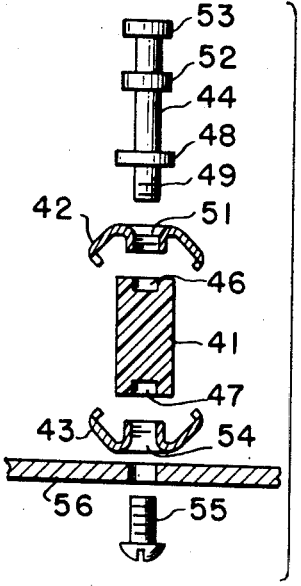
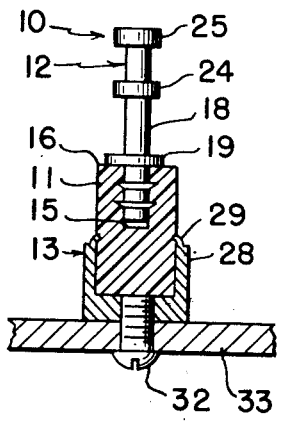
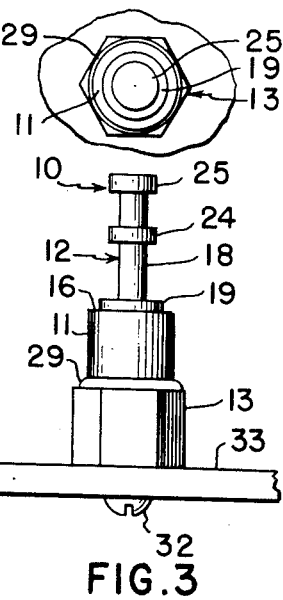
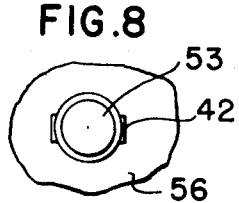
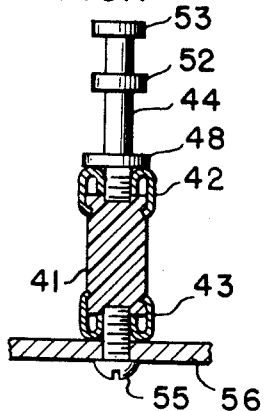
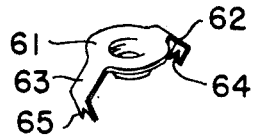
INVENTOR.
Merritt A. Rudner
BY
ATTORNEY United States Patent Office 2,785,219
Patented Mar. 12, 1957

2,785,219

STAND-OFF TERMINALS

Merritt A. Rudner, Haddonfield, N. J., assignor to United States Gasket Company, Camden, N. J., a corporation of New Jersey Application September 23, 1952, Serial No. 310,957

2 Claims. (Cl. 174—166)

This invention relates to stand-off terminals and particularly to small terminals that may be mounted on an insulating board, or on a metal platform, such as a chassis for electronic components.

One object of this invention is to provide a small stand-off terminal that may be mounted on a metal platform or chassis, and that will have adequate insulation for its intended service, and that will have sufficient inherent resiliency to enable it to withstand shock forces without cracking or breaking.

Another object of the invention is to provide a stand-off terminal of the foregoing type that may be quickly assembled on a platform, or base, such as a chassis, and that will withstand occasional excessive stresses that might be impressed thereon by excessive tightening of an anchoring screw, for example.

In the practice of the invention, a small body of insulating material, usually arranged in prismatic form, is used as a body to support a stand-off terminal pin at one end, and has an anchoring element clamp secured to the other end of the insulating body, with a portion of the clamp threaded to receive a hold-down screw to anchor the entire element to a platform, such as a chassis base.

The manner in which the terminal may be constructed is shown in two modifications as illustrated in the accompanying drawings, in which:

Figure 1 is an exploded view of the elements entering into the construction of the first modification, shown with an anchoring screw and a portion of a platform or chassis base to which the terminal is to be anchored;

Figure 2 is a side view, partially in elevation and partially in section, of the first modification as assembled and mounted on a base;

Figure 3 is a side elevational view of the terminal of Figure 2;

Figure 4 is a plan view of the assembled unit of Figure 3;

Figure 5 is an exploded view of the elements entering into the construction of the second modification, shown with a supporting platform and an anchoring screw;

Figure 6 is a perspective view of one of the clamping elements employed in the second modification;

Figure 7 is a side view with the supporting body and the clamping elements shown in section, and with the pin terminal shown in elevation; and Figure 8 is a plan view of the assembled terminal of Figure 7.

As shown in the drawings, the stand-off terminal 10, of the first modification, comprises a small cylindrical body 11 of insulating material, a stand-off terminal pin 12 to be anchored to the top of the insulating body 11, and an anchoring nut 13 to be fitted over the lower end of the insulating body 11 and to be pressed to tightly grip the insulating body 11.

The insulating body 11 is provided with a central axial bore 15, extending downwardly from the top surface 16 into the body 11 sufficiently to accommodate an anchoring portion on the terminal pin 12.

The pin 12 is shown comprising a body or shank 18 having a seating flange 19 to seat against and rest on the top surface 16 of the insulating body 11, and having two conical barbs or lands 21 and 22 integrally formed on a downwardly extending portion 23 of the shank 18. The upper end of the shank 18 of the pin is provided with two annular flanges 24 and 25 that serve to outline a terminal-receiving space for easy connection of a wire or terminal on an electrical conductor.

In assembling a pin, of the type shown as pin 12 in Figure 1, on an insulating body 11, the material of the insulating body should preferably have sufficient resilience to admit the shank at the lower end of the pin, with the conical barbs 21 and 22, and let the pin be pressed home into the recess or bore 15. The barbs 21 and 22 then become anchored in the body 11. Due to the resiliency of the body material, the temporarily displaced material, that was initially pushed aside by the barbs, moves back into position behind the barbs, to lock them in position in the insulating body 11.

Among the insulating materials which are particularly suitable for this application are the fluoro-carbon resins, such as polytetrafluoroethylene, commercially known as Teflon, and chlorotrifluoroethylene, commercially known as Kel-F.

For the purpose of the present application, any insulating material having the desired and necessary characteristics of insulation and resiliency may be employed, but because of the higher insulating qualities, including higher surface leakage resistance, and the shock-absorbing characteristics of those mentioned resins, they are suggested as being particularly suitable for this application. Of those two materials, Teflon is preferred because of its permitted higher operating temperature, and its greater ease of forming.

The resiliency characteristic of Teflon enables it to stretch sufficiently to move out of the way of the conical barbs 21 and 22, as they enter the bore 15, and then to move back into position behind those barbs to lock them in place against casual displacement or removal.

The clamping nut 13 is shown as comprising a base or floor section 27, a wall 28 of hexagonal shape and a thin cylindrical extension ring 29. The base 27 is provided with an axially threaded opening 30 to receive a positioning and holding screw 32 to hold the nut locked to a suitable base or platform 33, which may be the chassis of an electronic device.

The anchoring nut 13 is adapted to be secured to the insulating body 11 in such manner as to establish a tight grip of the nut on the body. That is accomplished by pressing the insulating body 11 home, into the internal recess 34, in the anchoring nut 13, within the wall 28 and the ring 29. After the insulating body 11 is pressed home and seated in the nut 13, the ring 29 is peened inwardly to grip the insulating body 11 as shown in Figure 2.

After the pin 12 and the lock nut 13 are thus secured to the insulating body 11, the assembly thus formed constitutes the stand-off terminal, and it may then be handled and stored as a unit until needed for assembling. The unit may then be disposed, as shown in Figures 2 and 3, to be anchored in place where needed on the base or chassis 33.

A second modification 40, as shown in Figures 5 to 8, inclusive, comprises a body 41 of insulating material, an upper clamp 42, a similar lower clamp 43, and a terminal pin 44. The insulating body 41 is provided with two shallow circular cylindrical coaxial recesses 46 and 47 for a purpose that will be presently described.

The terminal pin 44 is provided with a seating flange 48 and a threaded shank portion 49 extending downwardly to be threaded into a threaded opening 55 in the upper clamp 42. Above the seating portion 48, the terminal pin 44 has two flanges 52 and 53, similar to those on the pin in the first modification, in Figure 1, to define a space for receiving external circuit terminals or wire connections. The lower clamp 43 is also provided with a threaded central coaxial opening 54 to receive and accommodate a locking and positioning screw 55 that serves to secure the insulator to a base or chassis platform 56.

Each of the clamps 42 and 43, as shown in more detail in Figure 6, embodies an annular disc portion 61 with two winged portions 62 and 63, and each wing is provided with a forked element 64 and 65, respectively, having two fingers or tips for pressing into the insulating body and gripping that body, as shown in Figure 7. In that manner, the two clamps 42 and 43 are tightly secured to the insulating body 41 so that, when assembled, the entire unit as shown in Figure 7 constitutes a rigidly fixed assembly that may be handled and stored as a complete unit.

In order to provide additional spacing between the anchoring tips or fingers on forks 64 and 65 of the clamps, the two clamps may be preferably disposed at right angles relative to each other.

While the fluoro carbon resin have been referred to as being preferable because of their insulating qualities and their higher resilient physical characteristics, it will be clear that any other insulating material having such suitable characteristics may be equally well employed, within the scope of this invention.

In the first modification, as in Figure 2, the resiliency of the body results in added gripping force on the shank lower end due to the inward pressure of the peened in upper edge of the clamping nut 13.

In the second modification, as in Figure 7, the resiliency of the body material permits the transmission of gripping and reaction pressure forces between the fingers of the clamps 42 and 43 and the pin shank end 49, at the top, and the anchoring screw 55 at the bottom. The body material thus gripped between an external clamp and an inner shank or screw element helps to provide a tight grip on the body material.

The same tight grip may be obtained in the first modification, in Figure 2, if desired, by providing a short axial bore into the bottom of the body 11, to receive the anchoring screw 32 to press the body more tightly against the encircling nut 13.

The edges of the metal pressure elements that are pressed against the body, should be squared or rounded, rather than sharp, to avoid cutting or tearing the body material. That would include the edges of the lands 21 and 22, the rim 29 of the clamp nut 13, and the tips of fingers on elements 64 and 65.

In either of the modifications, the resiliency of the body material enables the material to react against any pressure forces, or their components, to establish increased friction pressure grips on the anchoring and gripping elements, or to return to regions from which the material has been displaced, thereby to serve as locking keys to retain and lock the element which caused the displacement of the materials.

The invention claimed is:

1. A stand-off terminal assembly comprising two metallic structures each having projections about the periphery thereof and each having base portions axially spaced from said projections, and a preformed body member consisting of polytetrafluoroethylene separating said metallic structures and having a portion of solid cross-section separating its opposite end portions, said assembly being characterized by the seating of opposite end portions of said body of polytetrafluoroethylene against said base portions and by the displacement of surface portions of said body of polytetrafluoroethylene by said peripheral projections rigidly to interlock said metallic structures with said body of polytetrafluoroethylene, said body of polytetrafluoroethylene being resilient and displaceable by said projections without distortion of the body as a whole in the regions of said projections, at least one of said metallic structures being cup-shaped and provided with turned-in edges forming said projections, said edges being pressed into an outer surface of said body member, one of said metallic structures providing a connector for electrical components, and the other of said metallic structures being threaded at a portion which is centrally disposed of its base for mechanically connecting said assembly to a supporting base.

2. A stand-off terminal assembly comprising a preformed body consisting of polytetrafluoroethylene and having a cavity at one end thereof, said body having a portion of solid cross-section separating opposite ends of said body, a first metallic terminal structure having an end portion press-fitted within said cavity for mechanical connection to said body, a peripheral land on said end portion within said cavity and tapered forward toward the opposite end of said body, said first metallic terminal structure having a base portion spaced from said land and in contact with said one end of said body, said land pressed into said cavity and deforming the adjacent wall portion thereof, said deformed wall portion moving by reason of the resiliency of polytetrafluoroethylene to surround said land to lock said metallic structure to said body, and a second metallic structure mounted on an opposite end of said body, said second metallic structure having a projection about the periphery thereof and a base portion axially spaced from said projection, said opposite end of said body being seated against said base portion and locked with said metallic structure by displacement of outer surface portions of said body of polytetrafluoroethylene by said peripheral projection, said second metallic structure being cup-shaped and provided with turned-in edges forming said projection, said edges being pressed into an outer surface of said body member, one of said metallic structures providing a connector for electric circuit components and the other of said metallic structures being threaded at a portion centrally of its base for mechanical connection of said assembly to a supporting member.

References Cited in the file of this patent

UNITED STATES PATENTS

| 983,573 | Schultz | Feb. 7, 1911 |
| 1,786,937 | Edson | Dec. 30, 1930 |
| 2,306,389 | Jorgensen | Dec. 29, 1942 |
| 2,431,951 | Mauerer | Dec. 2, 1947 |
| 2,436,284 | Bondon | Feb. 17, 1948 |
| 2,447,489 | Clark | Aug. 24, 1948 |
| 2,449,356 | Wilkoff | Sept. 14, 1948 |

FOREIGN PATENTS

| 885,143 | France | May 17, 1943 |
| 572,938 | Great Britain | Oct. 30, 1945 |
| 578,863 | Great Britain | July 15, 1946 |